(12) United States Patent
Lai

(10) Patent No.: US 10,843,616 B2
(45) Date of Patent: Nov. 24, 2020

(54) ELECTRIC TRANSPORTATION CART WITH ADJUSTABLE DECK

(71) Applicant: Ming-Tsung Lai, Chiayi County (TW)

(72) Inventor: Ming-Tsung Lai, Chiayi County (TW)

(73) Assignee: Chien-Hao Lai

( * ) Notice: Subject to any disclaimer, the term of this patent is extended or adjusted under 35 U.S.C. 154(b) by 0 days.

(21) Appl. No.: 16/724,392

(22) Filed: Dec. 23, 2019

(65) Prior Publication Data
US 2020/0231079 A1 Jul. 23, 2020

Related U.S. Application Data

(63) Continuation-in-part of application No. 16/253,194, filed on Jan. 21, 2019, now abandoned.

(51) Int. Cl.
| | |
|---|---|
| *B66F 7/06* | (2006.01) |
| *B60P 1/44* | (2006.01) |
| *B62B 3/00* | (2006.01) |
| *B66F 5/04* | (2006.01) |

(52) U.S. Cl.
CPC .......... *B60P 1/4421* (2013.01); *B60P 1/4478* (2013.01); *B62B 3/002* (2013.01); *B66F 5/04* (2013.01); *B66F 7/065* (2013.01)

(58) Field of Classification Search
CPC .............................. B66F 7/065; B66F 7/0625
See application file for complete search history.

(56) References Cited

U.S. PATENT DOCUMENTS

| | | | | |
|---|---|---|---|---|
| 4,526,346 A | * | 7/1985 | Galloway | B66F 7/08 182/148 |
| 4,556,198 A | * | 12/1985 | Tominaga | A61G 7/012 254/122 |
| 4,655,466 A | * | 4/1987 | Hanaoka | B62B 3/02 108/145 |
| 5,002,293 A | * | 3/1991 | Gottselig | B62B 3/02 108/145 |
| 6,857,493 B2 | * | 2/2005 | Shupp | B60T 7/16 180/168 |
| 6,971,837 B1 | * | 12/2005 | Williams | B65G 65/00 254/9 C |
| 7,070,167 B1 | * | 7/2006 | Bacon | B66F 7/0625 254/10 C |
| 7,249,771 B1 | * | 7/2007 | Brennan | A47J 37/0704 280/35 |
| 9,999,489 B1 | * | 6/2018 | Kern, Sr. | B66F 7/08 |

(Continued)

*Primary Examiner* — Mark C Hageman

(57) ABSTRACT

An electric transportation cart includes a deck having two first rails located on two sides thereof a base having multiple casters connected to the underside thereof and including two second rails on two sides thereof, a first link assembly and a second link assembly pivotably connected between the deck and the base, and a handle connected to one end of the base. A first bar is slidably connected between the two first rails, and a second bar is connected between the first link assembly and the second link assembly. A hydraulic cylinder is connected between the first bar and the second bar. The travel distance of the hydraulic cylinder is longer than that of the conventional transportation carts. Users operate the control unit to activate the hydraulic cylinder to drive the first and second link assemblies to control the deck to move up and down.

2 Claims, 14 Drawing Sheets

(56) References Cited

U.S. PATENT DOCUMENTS

| | | | |
|---|---|---|---|
| 2006/0006726 A1* | 1/2006 | Garvey | B62B 1/24 |
| | | | 298/2 |
| 2006/0181108 A1* | 8/2006 | Cleland | E05F 15/43 |
| | | | 296/146.4 |
| 2019/0023139 A1* | 1/2019 | Wechsler | B60L 53/12 |

* cited by examiner

ELECTRIC TRANSPORTATION CART WITH ADJUSTABLE DECK

The present invention is a Continuation-In-Part of the applicant's former patent application with the application Ser. No. 16/253,194, filed on Jan. 21, 2019.

FIELDS OF THE INVENTION

Descriptions of Related Art

The conventional transportation cans generally includes a deck with multiple casters connected to the underside of the deck, and a handle is connected to one end of the deck. Objects are put on the deck and transported from one place to another place conveniently by moving the cart. In order to assist the users to remove the objects from the deck to the ground or a desired position to protect the users' muscles from being injured due to frequent lifting and lowering the objects, a hydraulic cylinder is installed to the cart. The users can step a pedal to extend the cylinder so as to raise the deck, or push a button to retract the cylinder. However, the pedal has to be repeatedly stepped to extend the cylinder, and the force to step the pedal increases when the objects are heavy. The repeated action to the pedal also requires a lot of energy. Besides, the pedal needs maintenance to keep proper function. On the contrary, when pushing the button on the handle of the cart to retract the cylinder, the speed of lowering of the deck requires skill, because the objects on the deck can easily fall down.

The present invention intends to provide an electric transportation cart that eliminates the shortcomings mentioned above.

SUMMARY OF THE INVENTION

The present invention relates to an electric transportation can and comprises a deck having two first rails located on two sides thereof, a base having multiple casters connected to an underside thereof and including two second rails on two sides thereof, a first link assembly and a second link assembly between the deck and the base, and a handle connected to one end of the base and includes a switch unit connected thereto. A first bar is slidably connected between the two first rails, and a second bar is connected between the first link assembly and the second link assembly. A hydraulic cylinder is connected between the first bar and the second bar. The hydraulic cylinder is connected to a pump on the base. A control unit is connected to the base and includes a power source and a circuit board, wherein the switch unit, the power source and the pump are electrically connected to the circuit board. The users may operate the control unit to activate the hydraulic cylinder which drives the first and second link assemblies to control the deck to move up and down.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
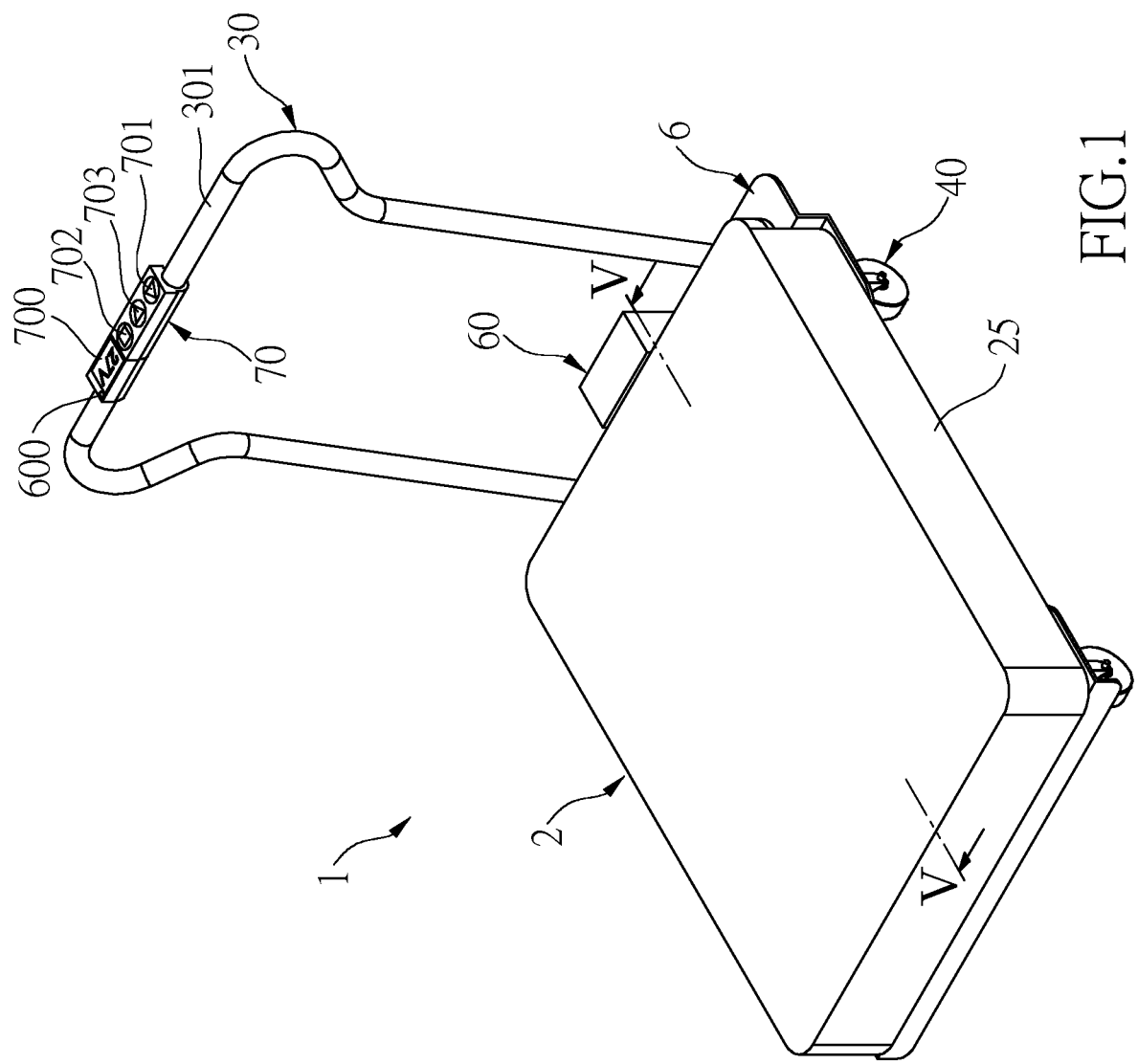
FIG. 1 is a perspective view to show the electric transportation cart of the present invention, wherein the deck is located at the lowest position.
Figure 2:
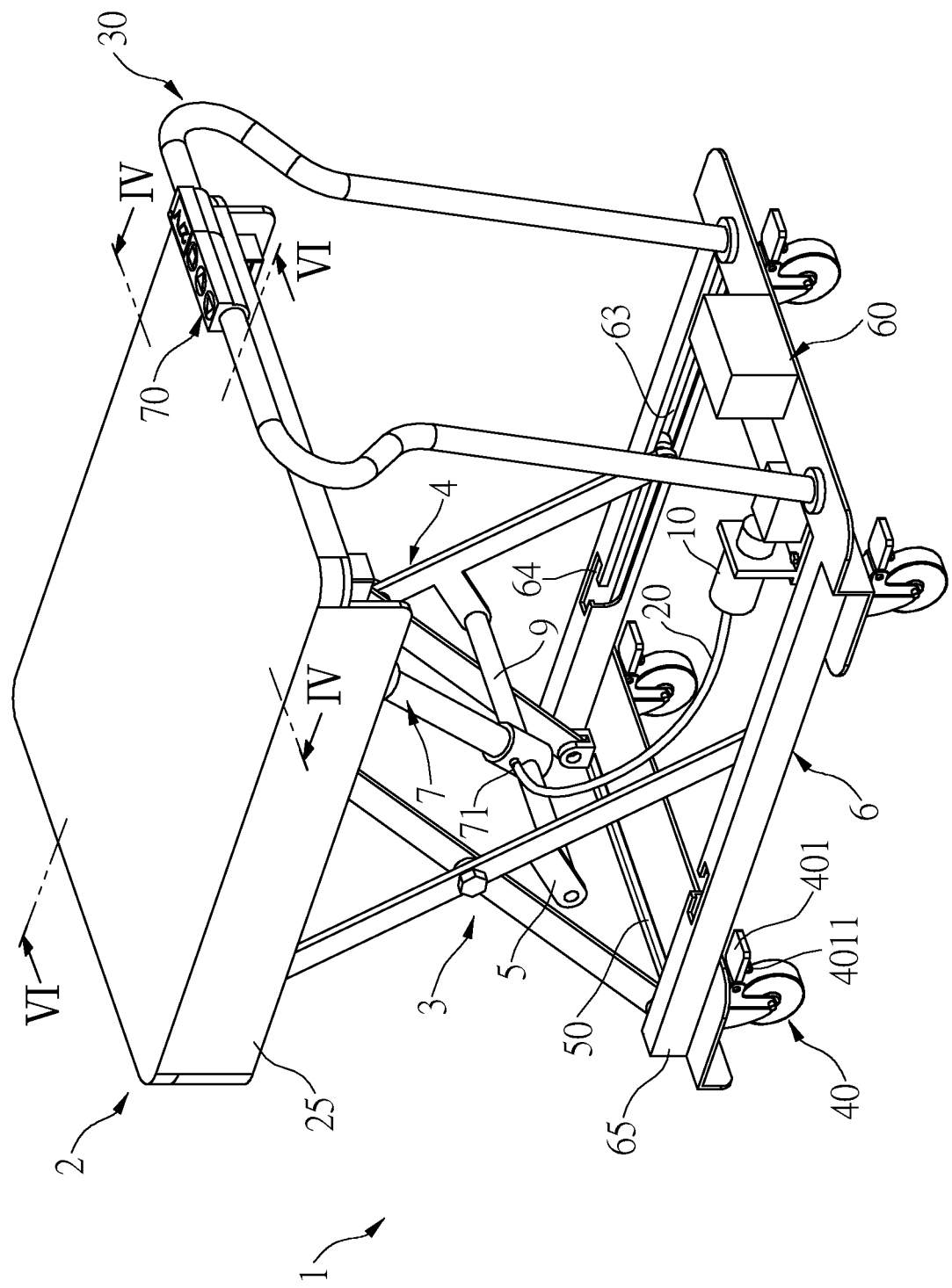
FIG. 2 is a perspective view to show the electric transportation cart of the present invention, wherein the deck is located at the highest position.
Figure 10:
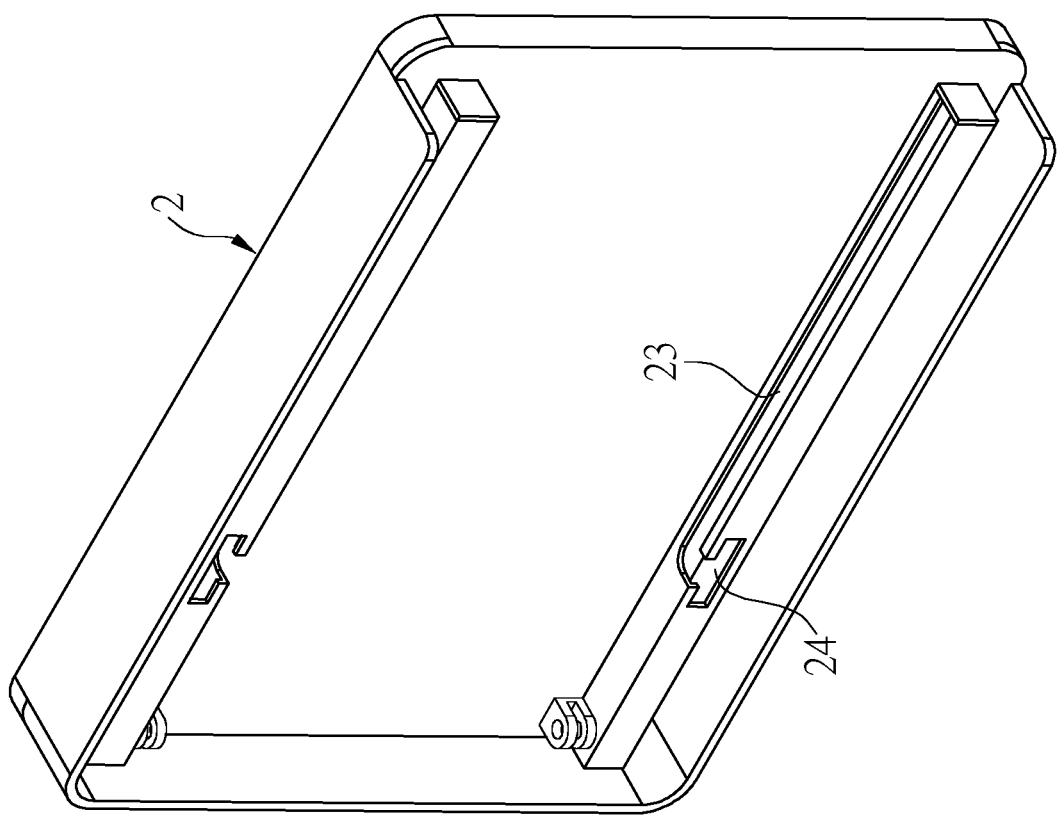
FIG. 10 shows the underside of the deck of the electric transportation cart of the present invention.

Referring to FIGS. 1 to 7, the electric transportation cart 1 of the present invention comprises a deck 2 having two first rails 23 located on two sides thereof. A base 6 includes multiple casters 40 connected to the underside thereof, and two second rails 63 are formed on two sides of the base 6. A first opening 24 is defined through the bottom wall of the two sides of the deck 2 and communicates with the first rail 23 corresponding thereto as shown in FIG. 10, and a second opening 64 is defined through the top wall of the two sides of the base 6 and communicates with the second rail 63 corresponding thereto as shown in FIG. 2. A handle 30 is connected to one end of the base 6 and a switch unit 70 is connected to the handle 30. A first bar 8 is slidably connected between the two first rails 23.

Figure 8:
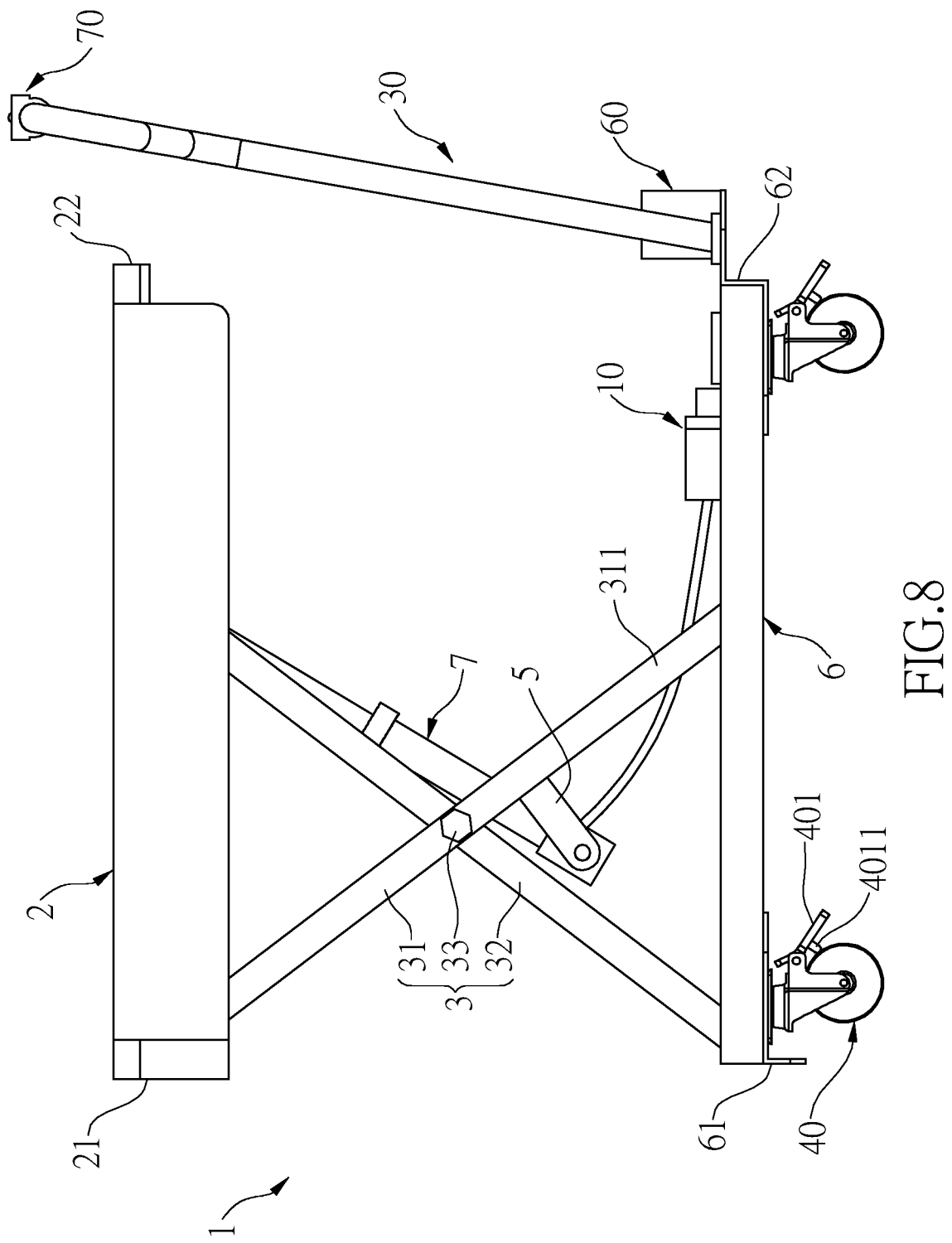
FIG. 8 is a side view to show the electric transportation cart of the present invention, wherein the deck is located at the highest position.
Figure 9:
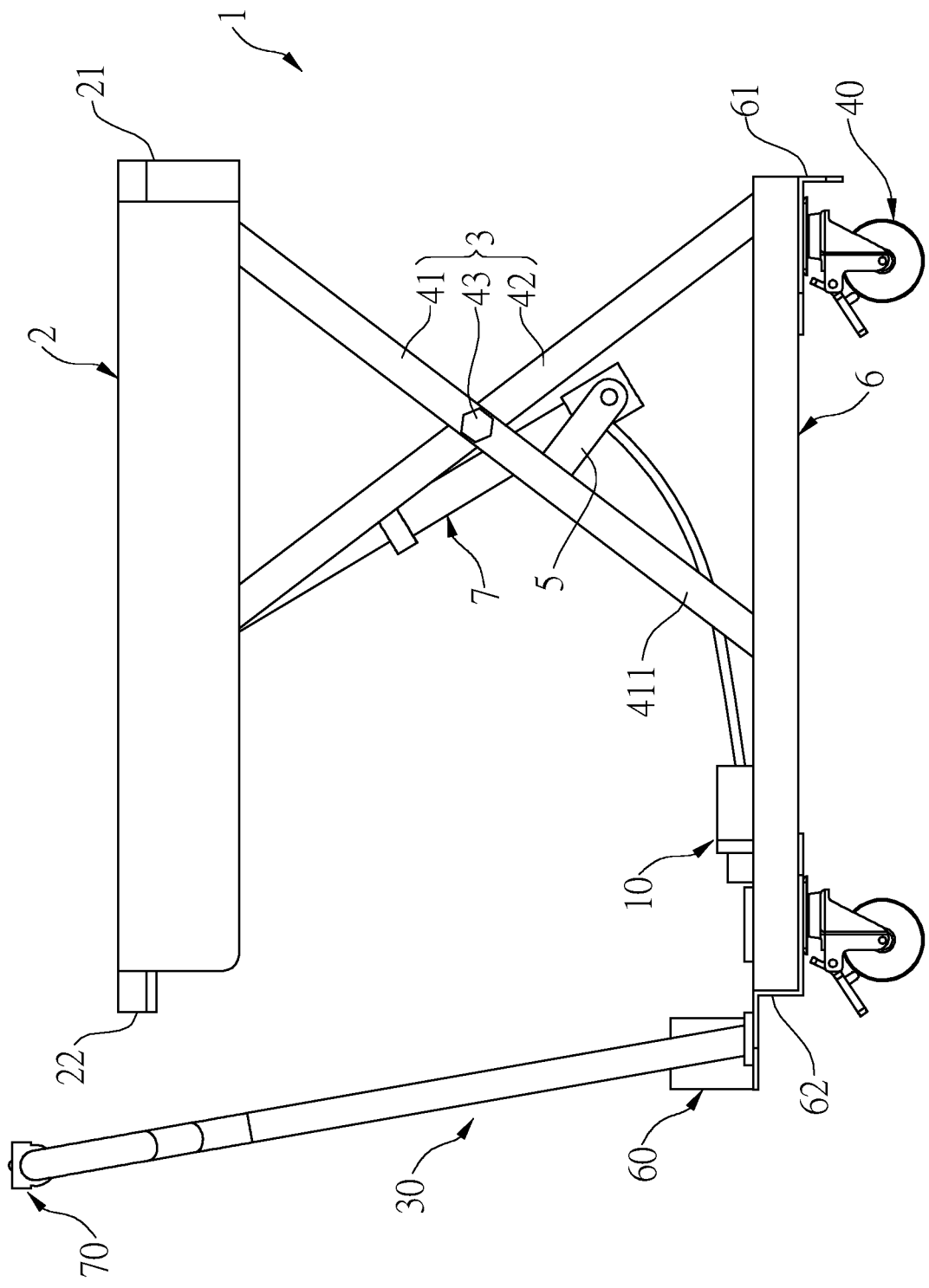
FIG. 9 is another side view to show the electric transportation cart of the present invention, wherein the deck is located at the highest position.

A first link assembly 3 and a second link assembly 4 are pivotably connected between the deck 2 and the base 6 so as to control the movement of the deck 2 relative to the base 6. The first link assembly 3 is located on the first side of the base 6 and the deck 2, and the second link assembly 4 is located on the second side of the base 6 and the deck 2. Specifically, as shown in FIGS. 8 and 9, the first link assembly 3 includes a first link 31 and a second link 32, and the second link assembly 4 includes a third link 41 and a fourth link 42. The first and second links 31, 32 are pivotably connected to each other at a first pivotal portion 33, and the third and fourth links 41, 42 are pivotably connected to each other at a second pivotal portion 43.

Figure 5:
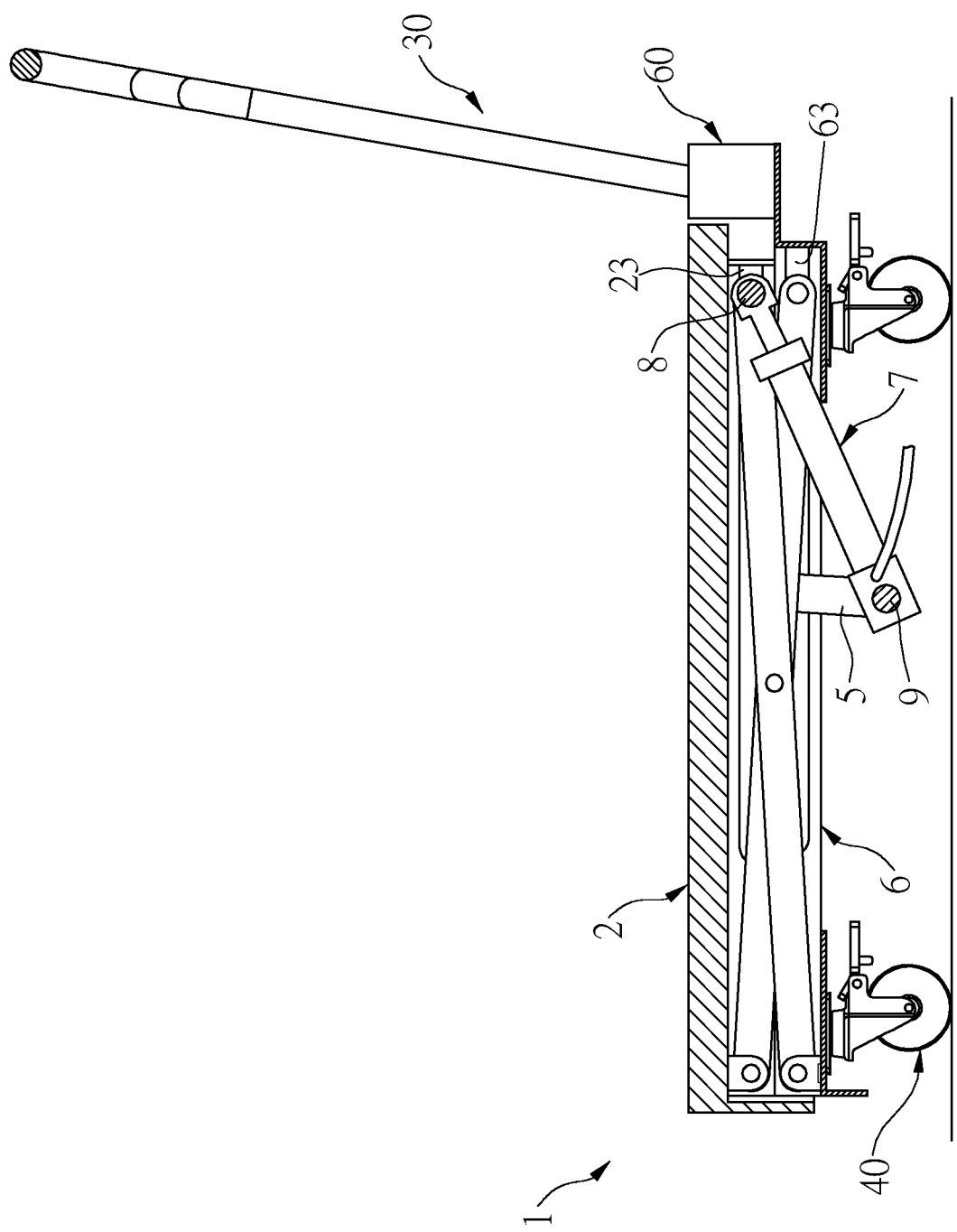
FIG. 5 is a cross sectional view, taken along line V-V of FIG. 1.
Figure 6:
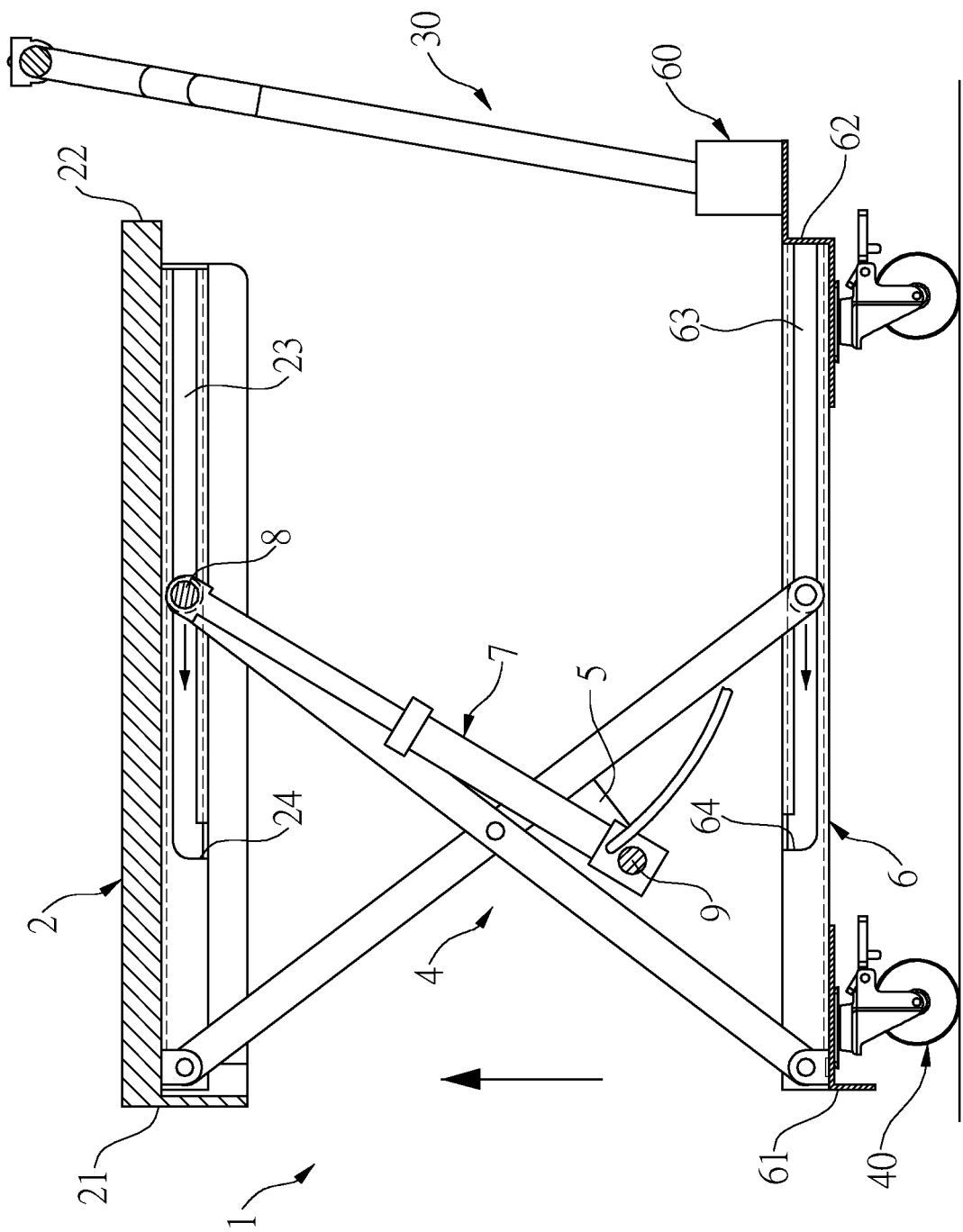
FIG. 6 is a cross sectional view, taken along line VI-VI of FIG. 2.

The deck 2 includes a deck front portion 21 and a deck rear portion 22 which includes the first rail 23. The base 6 includes a base front portion 61 and a base rear portion 62 which includes the second rail 63. The first link 31 and the second link 41 each are connected between the deck front portion 21 and the roller in the second rail 63. The second link 32 and the fourth link 42 each are connected between the base front portion 61 and the first bar 8. The first link 31 defines a section that is located below the first pivotal portion 33 as a first lower section 311. The second link 41 defines a section that is located below the second pivotal portion 43 as a second lower section 411. A second bar 9 is connected between the first and second lower sections 311, 411. Specifically, the first and second lower sections 311, 411 each have an extension link 5 extending toward the base 6, and the second bar 9 is connected between the two respective extension links 5. Specifically, the base 6 is a rectangular frame, and the when the deck 2 is located at the lowest position, the extension links 5 and the second bar 9 extend below the base 6 as shown in FIG. 5. The present invention is Besides, the first and second openings 24, 64 allow the first and second link assemblies 3, 4 to be easily installed to the first rails 23 and the second rails 63.

A hydraulic cylinder 7 connected between the first bar 8 and the second bar 9. The hydraulic cylinder 7 is connected to a pump 10 that is connected to the base 6. A hose 20 is connected to the connection hole 71 of the hydraulic cylinder 7 and the pump 10. A control unit 60 is connected to the base 6 and includes a power source 80 and a circuit board 90. The switch unit 70, the power source 80 and the pump 10 are electrically connected to the circuit board 90. Specifically, the handle 30 includes a grip 301 formed on the top thereof, and the switch unit 70 is located on the grip 301. As shown in FIG. 1, the switch unit 70 includes an "UP" button 701, a "STOP" button, and a "DOWN" button 703 to control the movement of the deck 2.

It is noted that none of the existed transportation carts has the specification feature that the extension links 5 extend below the base 6 when the deck 2 is located at the lowest position as the claimed invention. The deck 2 is allowed to be moved even lower than that of the conventional transportation carts. Because the second bar 9 is connected between the extension links 5, and the hydraulic cylinder 7 is connected between the first and second bars 8, 9, so that when the when the deck 2 is located at the lowest position, and the extension links 5 and the second bar 9 extend below the base 6, the travel distance of the hydraulic cylinder 7 is allowed to be longer than that used to the conventional transportation carts.

The deck 2 includes a side board 25 extending downward from three sides thereof, so that when the deck 2 is located at a lowest position as shown in FIG. 1, the outside 65 of the base 6 is covered by the side boards 25. By the side boards 25, dust is prevented from entering the space between the deck 2 and the base 6 when the deck 2 is located at the lowest position. When the deck 2 is located at a highest position as shown in FIG. 2, the distance between the top surface of the deck 2 to the base 6 is smaller than the distance between the top of the handle 30 and the base 6. Therefore, the deck 2 does not affect the users' hands on the grip 301.

Figure 3:
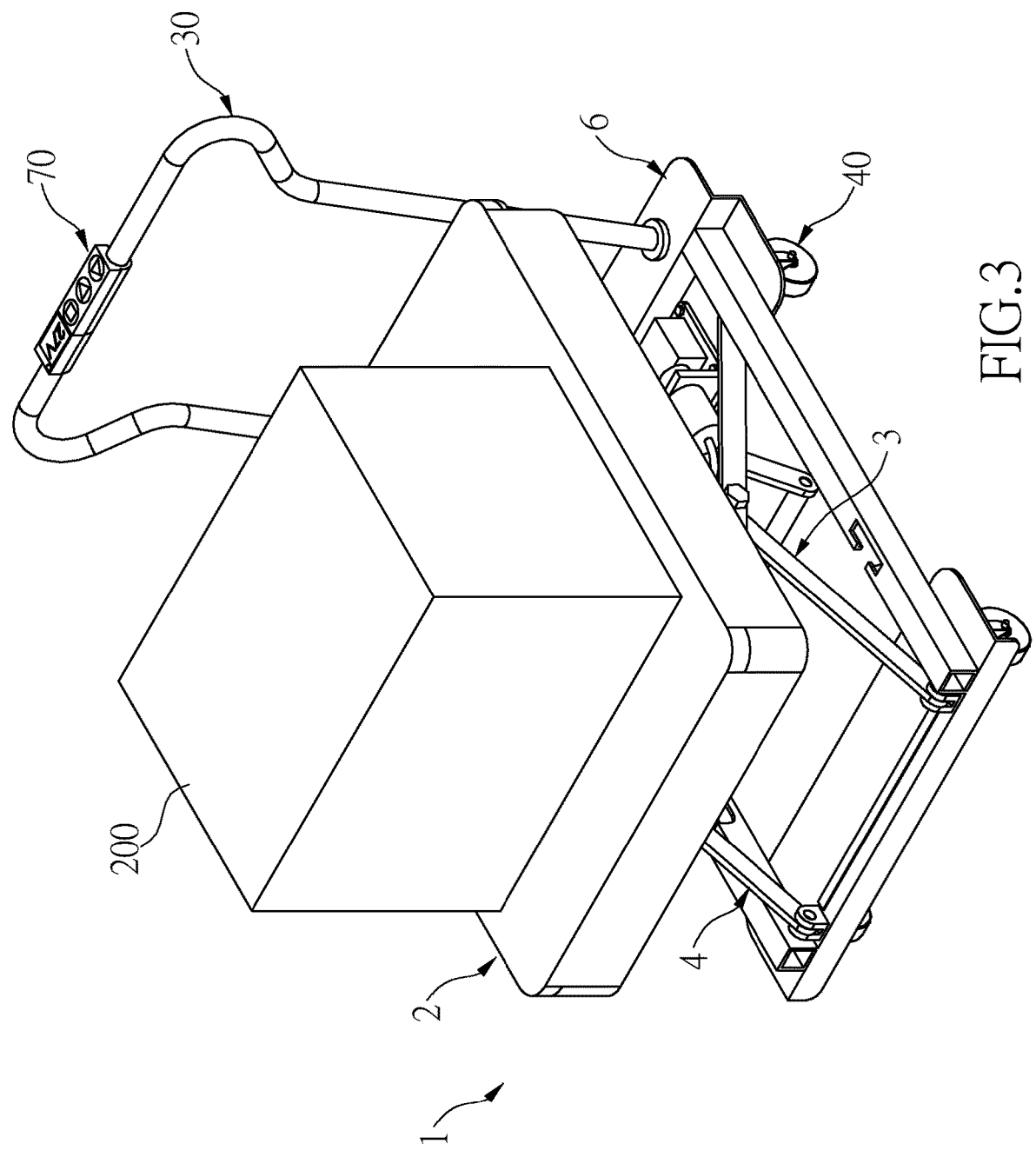
FIG. 3 is a perspective view to show the electric transportation cart of the present invention, wherein the deck stops during movement when an object is on the deck.
Figure 4:
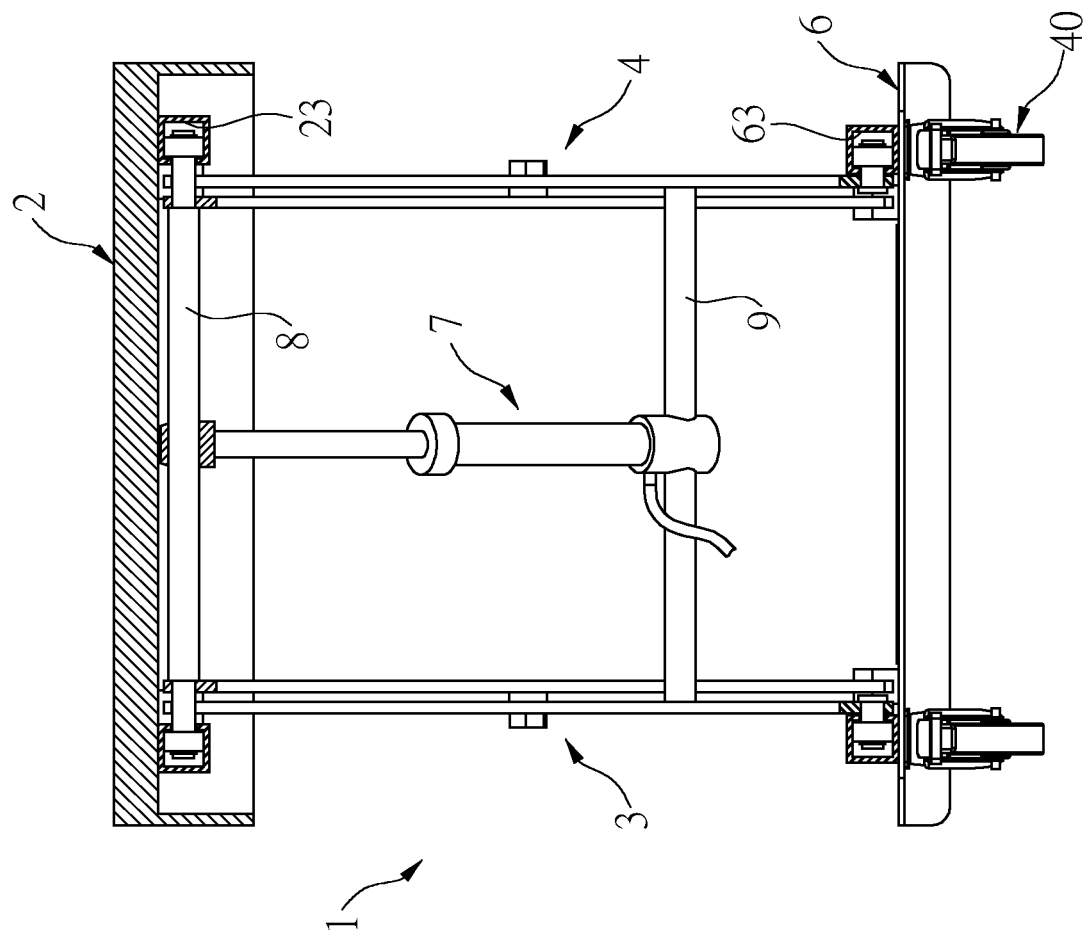
FIG. 4 is a cross sectional view, taken along line IV-IV of FIG. 2.

When in use, an object 200 is put on the deck 2 at the lowest position, and the user presses the "UP" button 701, so that deck 2 moves upward until the "STOP" button 702 is pressed. The operation to the "UP" button 701 makes the circuit board 90 sends a signal to activate the pump 10 which delivers hydraulic oil to the hydraulic cylinder 7 via the hose 20, and the piston rod of the hydraulic cylinder 7 extends to expand the first and second link assemblies 3, 4. When the "STOP" button 702 is pressed, as shown in FIG. 3, the pump 10 stops to deliver the hydraulic oil to the hydraulic cylinder 7, so that the deck 2 stops. The object 200 can be removed from the deck 2 to the desired position. When the user presses the "DOWN" button 703, the circuit board 90 sends a signal to activate the pump 10 which retrieves hydraulic oil back to the pump 10, and the piston rod of the hydraulic cylinder 7 retracts to collapse the first and second link assemblies 3, 4, the deck 2 is lowered. The speed that the deck 2 moves can be controlled by the feeding of the hydraulic oil from the pump 10. It is similar when the object 200 is to be lowered with the deck 2 at the highest position. The user does not need to repeatedly operate the pedal as mentioned in the conventional electric transportation can.

Figure 7:
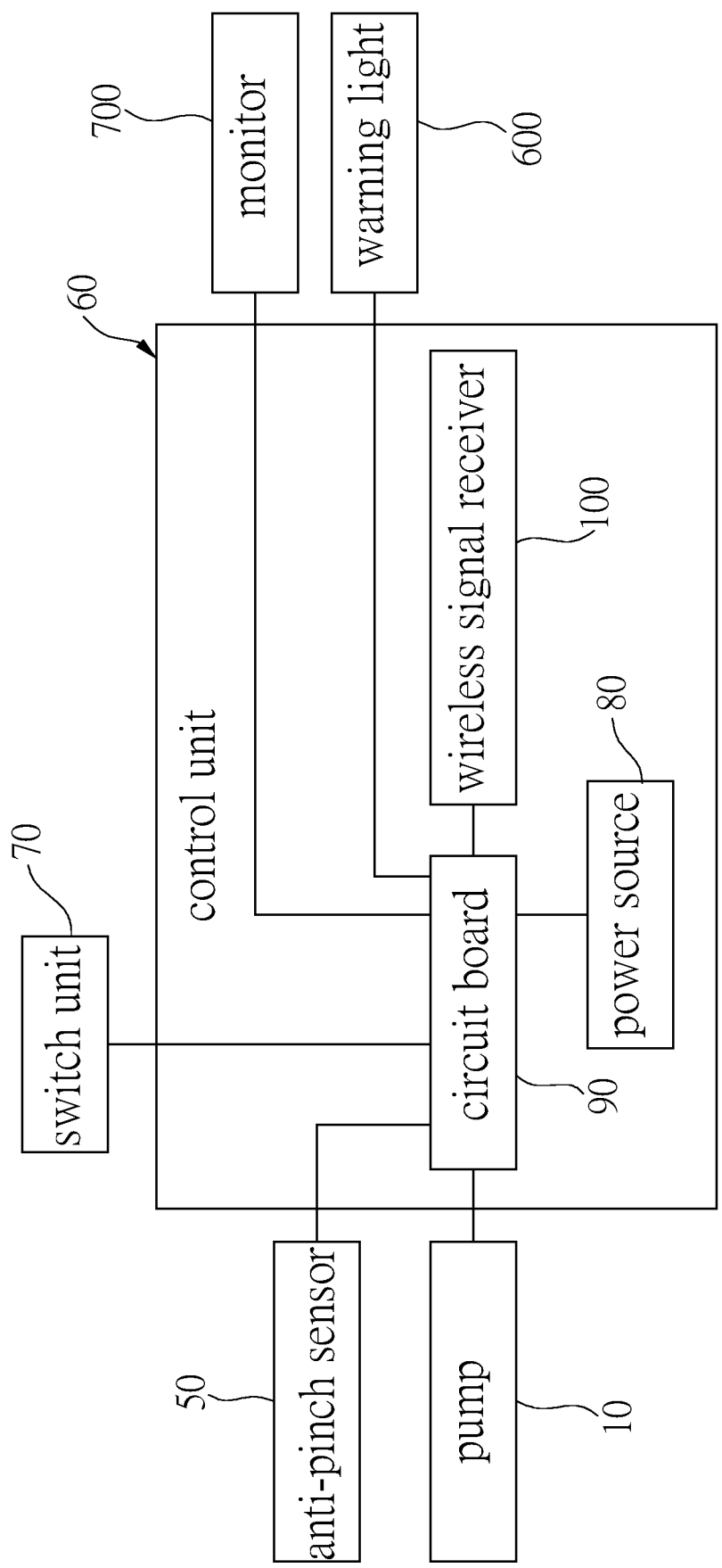
FIG. 7 is a block diagram showing the main parts of the electric transportation cart of the present invention.
Figure 11:
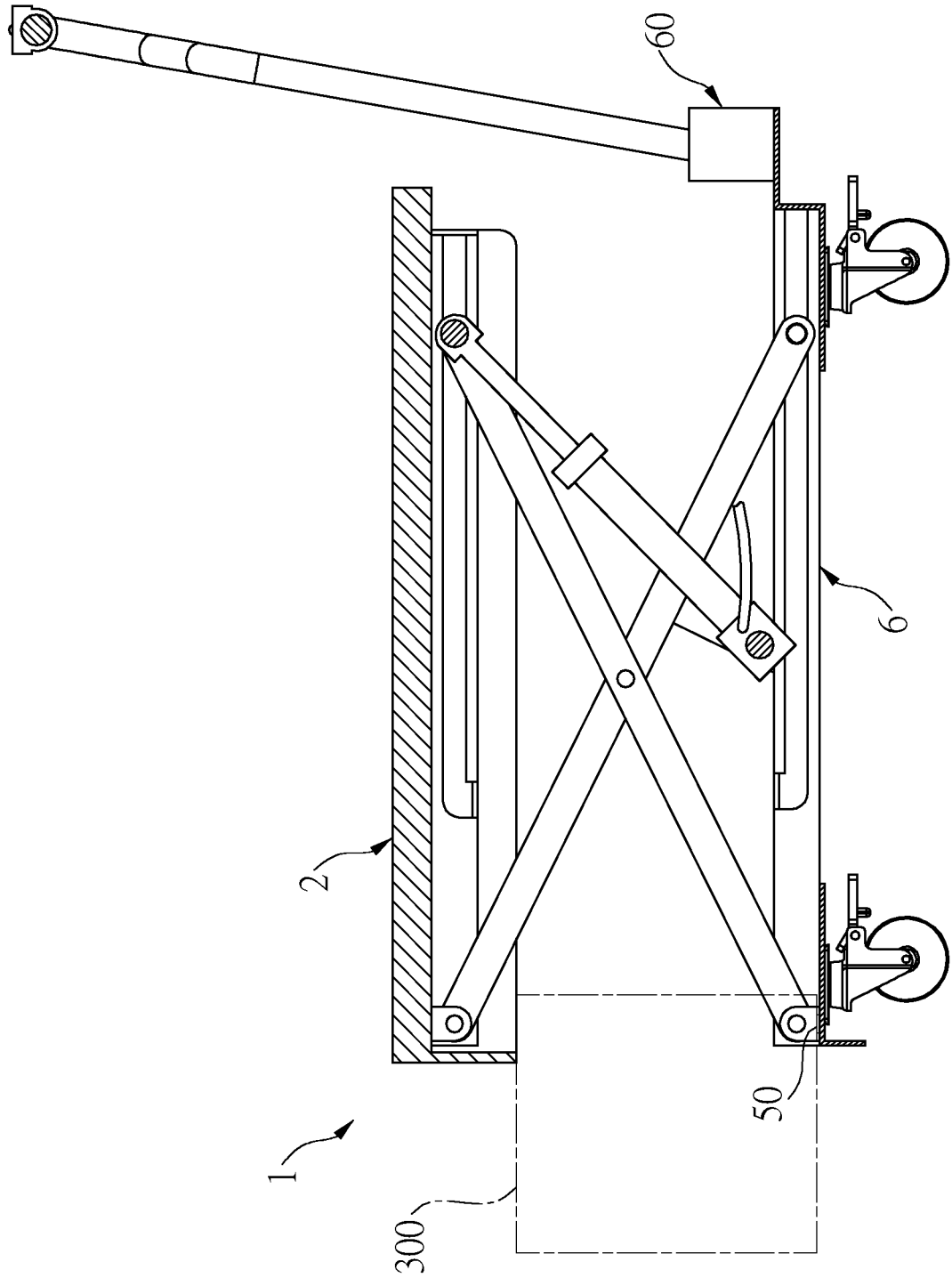
FIG. 11 shows the deck stops when the anti-pinch sensor detects an object.

As shown in FIGS. 7 and 9, at least one anti-pinch sensor 50 is connected to a top of the base 6, an underside of the deck 2, the first link assembly 3 or the second link assembly 4. When the at least one anti-pinch sensor 50 is activated during the deck 2 moves downward, the deck 2 stops or moves upward. The number of the anti-pinch sensor 50 and the positions where the anti-pinch sensor 50 is installed can be varied according to practical needs. When the anti-pinch sensor 50 is put at the top of the base 6, the user's sight may be blocked by the object 200 on the deck 2, so that when the deck 2 is lowered, a foreign piece 300 may be protruded in the space between the deck 2 and the base 6 as shown in FIG. 11, the anti-pinch sensor 50 put at the top of the base 6 can detect the foreign piece 300 and stops the deck 2.

As shown in FIGS. 5 and 8, each of the casters 40 includes a brake member 401, and the brake member 401 includes a contact member 4011 which contacts the caster 40 to stop the caster 40 from rolling.

Figure 12:
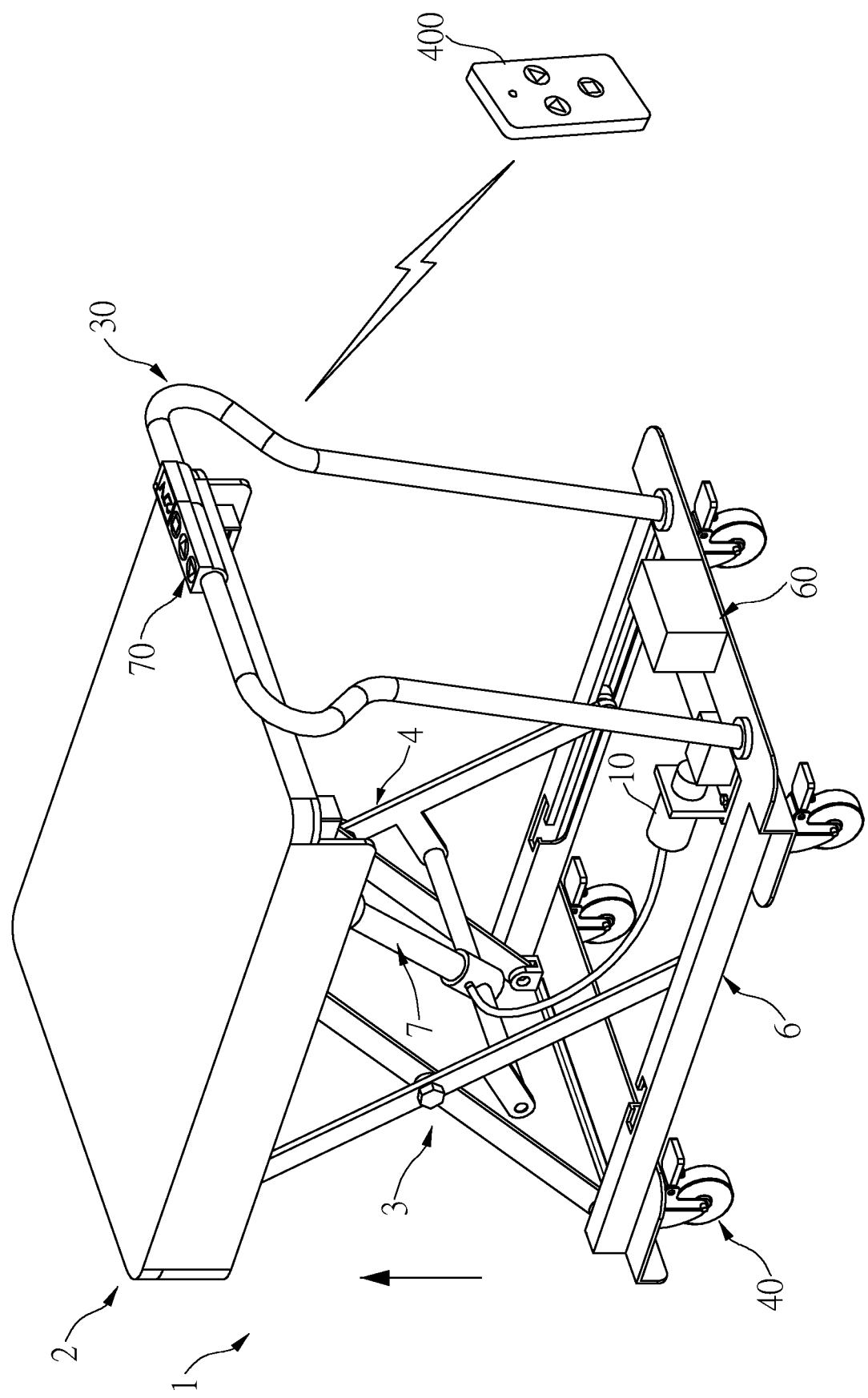
FIG. 12 shows that a remote control is used to control the operation of the electric transportation cart of the present invention.

As shown in FIGS. 7 and 12, the control unit 60 is connected to the base 6 and includes a wireless signal receiver 100 which is electrically connected with the circuit board 90. A remote control 400 sends commands to the control unit 60, and the wireless signal receiver 100 receives the commands from the remote control 400 to control the deck 2 to move up and down. This feature can be used when the user and the object 200 are on the deck 2 and to be moved to a higher place, while the user cannot touch the switch unit 70, the remote control 400 can be used.

Figure 14:
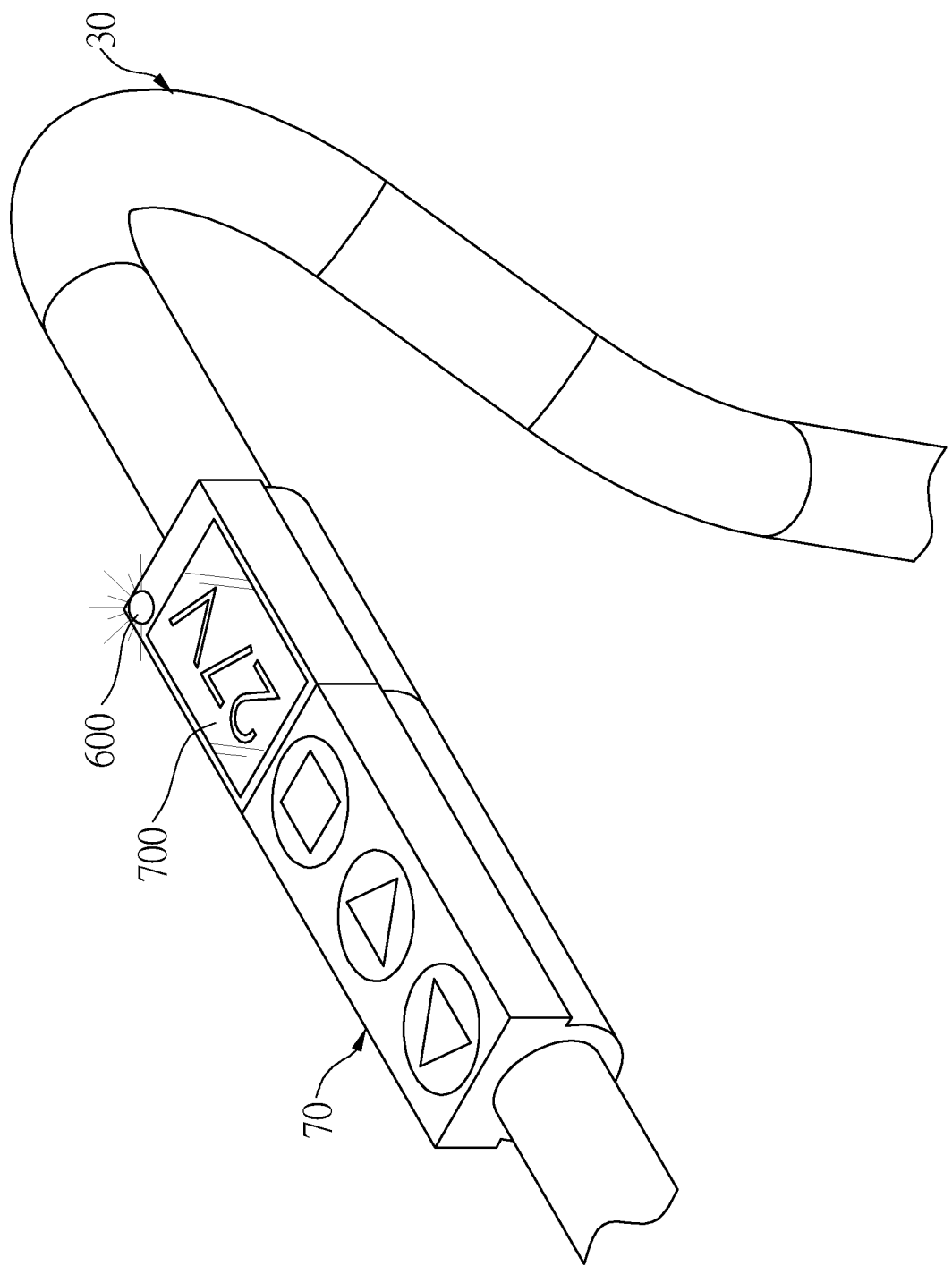
FIG. 14 is an enlarged view to show the switch unit on the handle.

Besides, as shown in FIG. 14, a warning light 600 and a monitor 700 are installed to the switch unit 70, wherein the monitor 70 is electrically connected to the circuit board 90 to display current voltage of the power source 80. When the power source 80 is lower than a pre-set value, the circuit board 90 stops operation of the power source 80 and the warning light 600 lights up.

Figure 13:
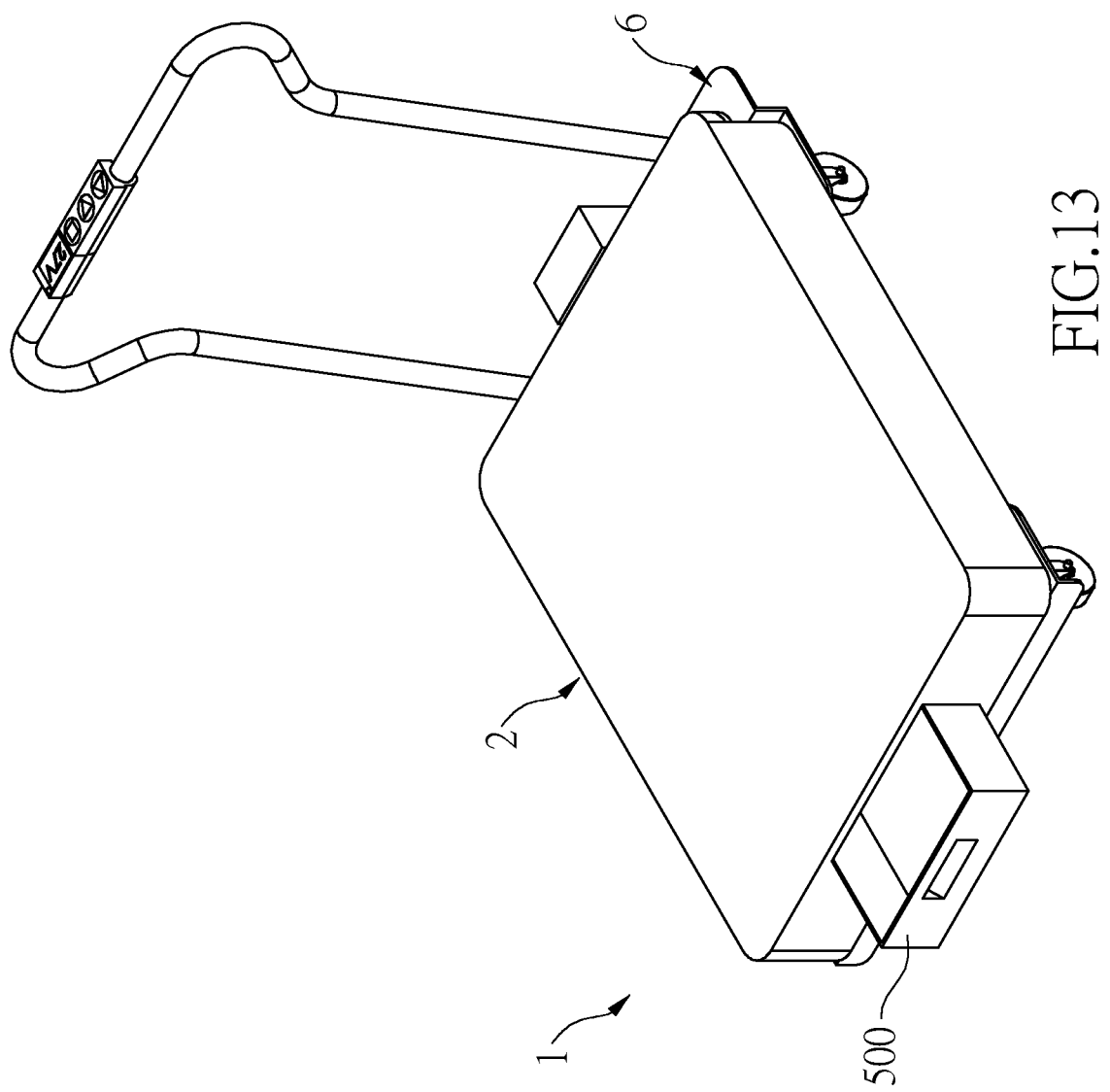
FIG. 13 shows that the deck includes a drawer.

As shown in FIG. 13, the deck 2 includes a drawer 500 which is adapted to accommodate tools.

While we have shown and described the embodiment in accordance with the present invention, it should be clear to those skilled in the art that further embodiments may be made without departing from the scope of the present invention.

What is claimed is:

1. An electric transportation cart comprising:
a deck having a deck front portion and a deck rear portion, the deck rear portion including two first rails which are located on two sides of the deck, a first opening defined through a bottom wall of the two sides of the deck and communicating with the first rail corresponding thereto;
a base being a rectangular frame and having multiple casters connected to an underside thereof, the base having a base front portion and a base rear portion which includes two second rails, the two second rails located on two sides of the base, a second opening defined through a top wall of the two sides of the base and communicating with the second rail corresponding thereto, a handle connected to one end of the base and a switch unit connected to the handle;

a first bar slidably connected between the two first rails;

a first link assembly and a second link assembly pivotably connected between the deck and the base, the first link assembly including a first link and a second link, the second link assembly including a third link and a fourth link, the first and second links located on a first side of the cart and pivotably connected to each other at a first pivotal portion, the third and fourth links located on a second side of the cart and pivotably connected to each other at a second pivotal portion, the first link defining a section that is located below the first pivotal portion as a first lower section, the third link defining a section that is located below the second pivotal portion as a second lower section, the first and second lower sections each having an extension link extending toward the base, a second bar connected between the two respective extension links, the first link assembly installed to the first rails via the first opening defined through the bottom wall of the two sides of the deck, the second link assembly installed to the second rails via the second opening defined through the top wall of the two sides of the base;

two opposite ends of the first link respectively connected to one of two ends of the first bar and a roller slidably in one of the two second rails, two opposite ends of the third link respectively connected to another one of the two ends of the first bar and another roller slidably in another one of the two second rails, the second link and the fourth link each being connected between the base front portion and the first bar, when the deck is located at a lowest position, the extension links and the second bar extend below the base;

a hydraulic cylinder connected between the first bar and the second bar, the hydraulic cylinder connected to a pump that is connected to the base, wherein when the deck is located at the lowest position a length of the hydraulic cylinder is at a minimum and the extension links and the second bar extend below the base;

a control unit connected to the base and including a power source and a circuit board, the switch unit, the power source and the pump electrically connected to the circuit board, and the pump being activated by operating the control unit to extend or retract the hydraulic cylinder so as to activate the first and second link assemblies to move the deck up and down relative to the base.

2. The electric transportation cart as claimed in claim 1, wherein the control unit is connected to the base and includes a wireless signal receiver which is electrically connected with the circuit board, a remote control sends commands to the control unit, the wireless signal receiver receives the commands from the remote control to control the deck to move up and down.

* * * * *